United States Patent
De Reyes

(10) Patent No.: US 8,468,829 B2
(45) Date of Patent: Jun. 25, 2013

(54) LIQUID NITROGEN ENGINE

(76) Inventor: Edward Mark De Reyes, Venice, CA (US)

(*) Notice: Subject to any disclaimer, the term of this patent is extended or adjusted under 35 U.S.C. 154(b) by 904 days.

(21) Appl. No.: 12/571,312

(22) Filed: Sep. 30, 2009

(65) Prior Publication Data

US 2010/0077753 A1 Apr. 1, 2010

Related U.S. Application Data

(60) Provisional application No. 61/101,766, filed on Oct. 1, 2008.

(51) Int. Cl.
*F01K 25/08* (2006.01)
*F02K 3/02* (2006.01)

(52) U.S. Cl.
USPC ............. 60/651; 60/671; 60/226.1; 60/649

(58) Field of Classification Search
USPC ............. 60/39.01, 649, 651, 671, 226.1, 229, 60/728, 805; 415/219.1, 220–223
See application file for complete search history.

(56) References Cited

U.S. PATENT DOCUMENTS

| | | | | |
|---|---|---|---|---|
| 2,677,932 A * | 5/1954 | Forsling | ............. | 60/39.15 |
| 2,783,965 A * | 3/1957 | Birmann | ............. | 415/115 |
| 3,482,804 A * | 12/1969 | Pyptiuk | ............. | 244/53 R |
| 3,949,549 A * | 4/1976 | Holl | ............. | 60/226.1 |
| 2006/0242962 A1* | 11/2006 | Johnson | ............. | 60/761 |
| 2011/0110783 A1* | 5/2011 | Addis et al. | ............. | 416/219 R |

* cited by examiner

*Primary Examiner* — Hoang Nguyen
(74) *Attorney, Agent, or Firm* — David J. Pitman; Fulwider Patton LLP

(57) ABSTRACT

An engine is described that derives its propulsive energy from the flash expansion of liquid nitrogen from a liquid form to a gaseous form. The gaseous nitrogen is forced to escape from the rear of a casing of the engine, thereby providing a propulsive force to the casing. The escaping gaseous nitrogen, mixed with air, is harnessed to rotate a first fan that in turn rotates a second fan that draws air into the front of the engine. The warmer air flowing through the engine is utilized to regulate the temperature of the engine, and to facilitate the evaporation of the nitrogen propellant, thereby creating a steady state condition that may last as long as the supply of liquid nitrogen.

17 Claims, 4 Drawing Sheets

LIQUID NITROGEN ENGINE

CROSS-REFERENCES TO RELATED APPLICATIONS

This application claims priority from provisional U.S. Application No. 61/101,766, filed Oct. 1, 2008, which is incorporated herein by reference in its entirety.

FIELD OF THE INVENTION

This application relates generally to propulsion devices, and in particular, to a system and method for generating propulsion utilizing the energy provided when liquid nitrogen undergoes a phase change from liquid to gaseous nitrogen.

BACKGROUND

Various systems have been developed to meet the ever increasing demands for power of the modern world. These systems typically use combustible fossil fuels such as natural gas, oil, and coal. Typically, the fossil fuel is burned to generate thermal energy that, in turn, is converted to mechanical energy. While fossil fuel systems are adequate for their intended purpose, these types of systems have two inherent problems. First, the burning of fossil fuels may produce environmentally damaging by-products. Second, the natural supplies of fossil fuels used in these systems are rapidly becoming depleted. Consequently, it has become necessary to develop alternative sources of energy and methods for harnessing these sources.

In order to overcome the inherent problems associated with the use of fossil fuels, various alternative-energy systems have been developed. For example, solar energy systems and systems utilizing wind power are presently in use. Also, bio-fuels made from growing vegetation have also been developed. However, these systems also have certain limitations inherently associated with their use. For example, these systems often require large, expensive, and non-permanent energy-gathering structures such as windmills or solar panels to generate sufficient energy for uses that have modest to high power demands. Hence, given the size requirements of such systems, they are impractical for use in products such as motor vehicles.

Furthermore, other types of systems have been developed that convert heat energy into mechanical energy by circulating a liquefied gas in a closed cycle. In most of these systems, the liquefied gas, during circulation, exchanges heat with heat energy of another substance. Once again, while liquefied gas systems are functional for their intended purpose, these systems are complicated and require specialized equipment in order for the systems to function properly. For example, a known method may include the steps of inserting a liquefied gas in a closed container at a temperature and pressure less than the critical temperature and pressure of the gas. The liquefied gas is heated to the critical temperature and above the critical pressure. The gas is subjected to a heat exchange with another medium thereby heating the gas and cooling the medium. The gas expands to a predetermined pressure, and thereafter, valves open to allow the gas to flow into a high-pressure tank wherein the pressure of the gas is regulated. When the pressure of the gas exceeds a predetermined threshold, a valve on the high-pressure tank is opened and the gas flows to a means such as a turbine that transforms the expansion of the gas into mechanical energy and that reduces the temperature of the gas below the critical temperature. Typically, a portion of the power generated is used to effect the flow of all of the fluids in the system. Thereafter, the gas is liquefied and returned to the closed container. It can be appreciated that the complexity and resulting expense of such a device renders the device close to impractical for many applications.

Accordingly, there is a need in the art for a system and method that overcomes such shortcomings in the art. The present invention addresses these and other needs.

SUMMARY OF THE INVENTION

The present invention describes an engine for providing a propulsive force and propulsive motion. In a preferred embodiment, the engine comprises a casing with a forward terminal end and a rearward terminal end. The casing has a hollow interior defined by a bore that has an axis of symmetry, the bore extending continuously along the axis from the forward end to the rearward end. The bore includes a flow constriction at a location between the forward end and the rearward end. A center body is positioned within the bore and sized such that the bore is not completely obstructed at any point between the forward end and the rearward end. The center body is shaped to have a highly aerodynamic shape, in order to allow an airstream to move across its outer surface with a minimum of drag. The center body includes a forward hub, a middle hub, and a rearward hub, the middle hub being flanked by the forward hub and the rearward hub, wherein the forward hub and the rearward hub are connected to each other by a rod extending rotationally freely through the middle hub. Under this configuration, the forward hub and the rearward hub are configured to rotate in unison while the middle hub remains rotationally stationary. A forward fan is attached to the forward hub, and a rearward fan attached to the rearward hub. The rearward fan is configured to drive the forward fan, and the forward fan is configured to draw air from outside the casing into the bore. The forward fan, the rearward fan, and the bore are configured in relation to each other such that air drawn into the casing is propelled through the bore in a continuous stream from the forward end to the rearward end.

A plurality of support elements are also provided, each support element being connected to the casing at a first portion of the support element, and to the middle hub at a second portion of the support element. The support elements are collectively configured to support the middle hub in relation to the casing. At least one delivery tube is provided. The delivery tube extends from a first location outside the casing to a second location in the bore of the casing, the delivery tube being configured to deliver liquid nitrogen from the first location to the second location.

Under this configuration, air may be initially drawn into the bore of the casing at the forward end by an independently operating fan or motor, and expelled out of the casing at the rearward end. The engine derives its propellant force from the effect of liquid nitrogen that is delivered into the bore via the delivery tube. The relatively warmer air that comes into contact with the liquid nitrogen in the bore causes the liquid nitrogen to rapidly evaporate, and thus to expand by a factor of many hundreds of times. Because air is streaming through the bore and being expelled from the rearward end, initially under independent propulsive force, the expanding nitrogen gas is driven through the bore and is also expelled from the rearward end of the bore, thereby providing a forward propellant force to the engine, and importantly, a force applied to the rearward fan that is sufficient to rotate the interconnected forward fan. The forward fan draws more air into the forward end of the bore, and sets up a steady state of flow under which a constant stream of air passes through the bore from forward end to rearward end, and a propulsive force is constantly applied to the engine for as long as the supply of liquid nitrogen lasts.

In a further aspect of the invention, the at least one delivery tube comprises a hollow bore extending within one of the support elements. Furthermore, the bore extending within one of the support elements connects to a bore extending within the middle hub, and the bore extending within the middle hub opens onto an external surface of the middle hub. As a result, the passage for the liquid nitrogen is configured to emerge on an outer surface of the center body, thereby positioning it conveniently for evaporation by air streaming over the center body.

In another aspect of the invention, the at least one support element is connected to the casing at the first portion of the support element through a first rotationally movable bearing, and is connected to the middle element at the second portion of the support element through a second rotationally movable bearing. This allows the center body to be movable along the axis of the bore while being supported by the support elements. This movability allows the user to adjust the size of constriction in the bore, and also allows the user to adjust the longitudinal position of the openings in the bore in relation to the constriction. These adjustment capabilities conveniently permit the user to adjust to environmental conditions such as temperature, pressure, and humidity, by moving the openings closer of further from the constriction, and also by permitting adjustment in the size of the constriction. Thus, the flow constriction in the bore includes the center body positioned to partially obstruct a portion of the bore, and movement of the center boy permits adjustment in the size of the constriction.

In two different embodiments of the invention, in a first embodiment the forward fan is configured to drive air perpendicularly across a diameter of the fan, and in a second embodiment the forward fan is configured to drive air parallel with a diameter of the fan, or radially outward from the center of the casing.

The present invention is also reducible to a process, or method, for providing propulsive power to an engine. The method of the invention comprises providing an engine casing having a bore extending from a forward terminal end of the casing to a rearward terminal end of the casing. Air is forced in a continuous stream through the bore from the forward end, to emerge from the bore at the rearward end. Liquid nitrogen is injected into the bore at the same time that air is being forced through the bore. The effect of the air on the liquid nitrogen is to evaporate the liquid nitrogen into gaseous form in the presence of the air. The resulting mixture of air and liquid nitrogen is expelled from the rearward end of the casing thereby providing a forwardly propulsive force to the casing. In aspects of the invention, the step of forcing air through the bore includes rotating a first fan inside the bore using, as a rotational propellant, the nitrogen mixed with air being expelled from the casing, and thereby rotating a second fan connected to the first fan so that the second fan draws air into the casing. Under this arrangement, a steady state flow may be established under which air is constantly drawn in the front of the casing bore, and expelled from the rear along with the evaporated nitrogen. This steady state may be maintained for as long as the liquid nitrogen supply lasts.

In one aspect of this invention, forcing air through the bore includes forcing the air past a constriction in the bore, thereby accelerating the air in the vicinity of the constriction, furthermore, forcing air past a constriction includes forcing the air past a reduction in an internal diameter of the bore to facilitate the evaporation of the liquid nitrogen. Additionally, forcing air past a constriction may include forcing the air around an aerodynamically shaped element located within the bore. By forcing the air past a constriction in the bore, a reduction in pressure head in the air is achieved, thereby facilitating the rapid evaporation of liquid nitrogen.

In a preferred aspect, injecting liquid nitrogen into the bore includes injecting the liquid nitrogen to a location in the bore that coincides with the location of the constriction in the bore, and moreover, it may further include electively changing the size of the constriction in the bore. This may be accomplished by moving the aerodynamically shaped object along the axis of the bore to alter the amount of partial obstruction, or constriction, of the bore.

Thus, a system and method of providing a convenient, environmentally friendly, and inexpensive motor is described, over which the user has the ability to respond to changing environmental factors. The fuel for the motor is provided by liquid nitrogen which is abundantly available in the atmosphere.

These and other aspects of the invention may be more fully understood with reference to the drawings, and the detailed description of the preferred embodiments.

DETAILED DESCRIPTION OF THE PREFERRED EMBODIMENTS

With reference to the figures which are provided by way of exemplification and not limitation, an engine having preferred features of the present invention is described. As may be seen in the figures, the engine of the present invention has some of the features of a typical Brayton cycle engine, but has differences that provide novel and useful features of an engine.

Figure 1:
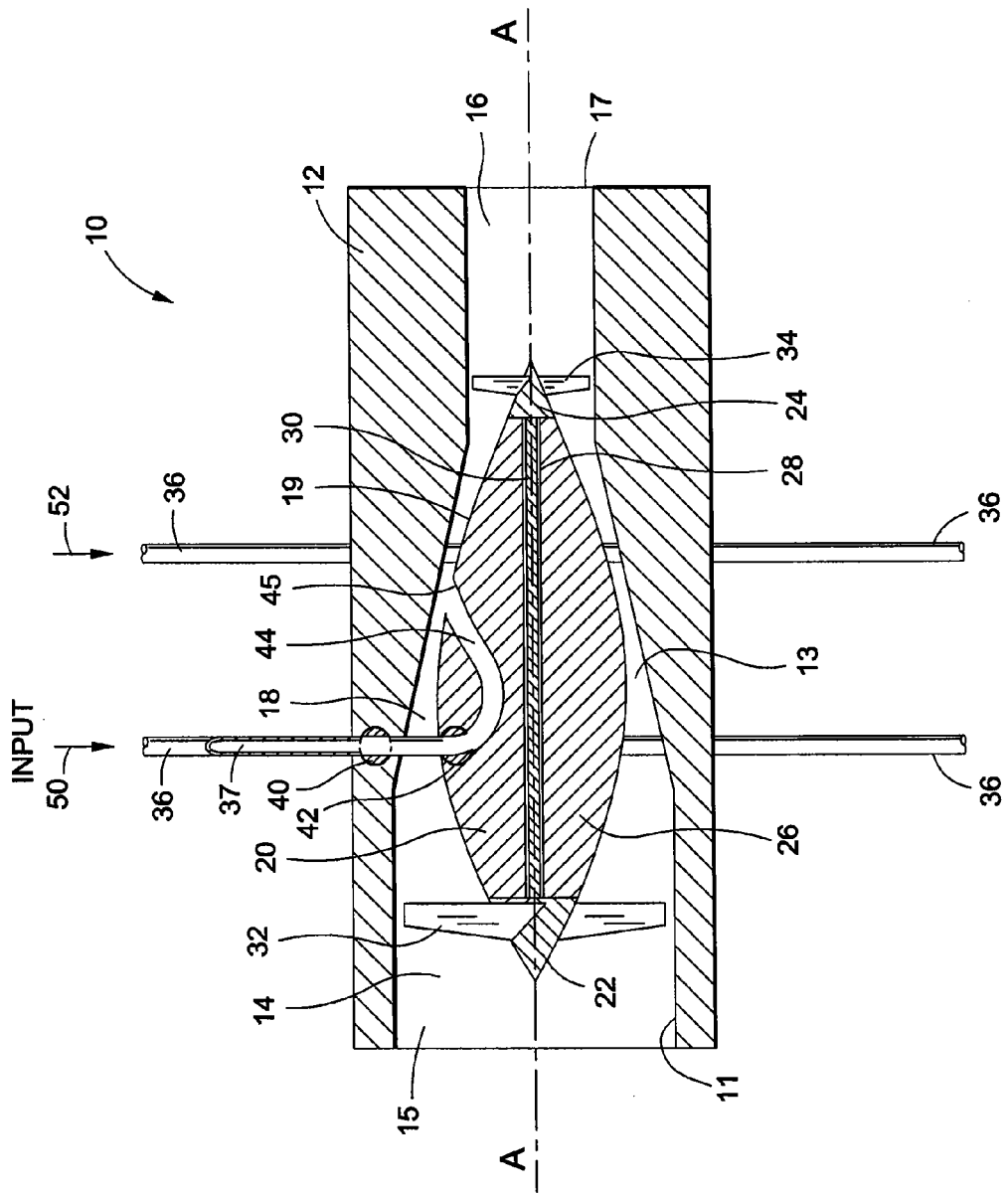
FIG. 1 is a sectional side view of a first embodiment of an engine having features of the present invention.
Figure 2:
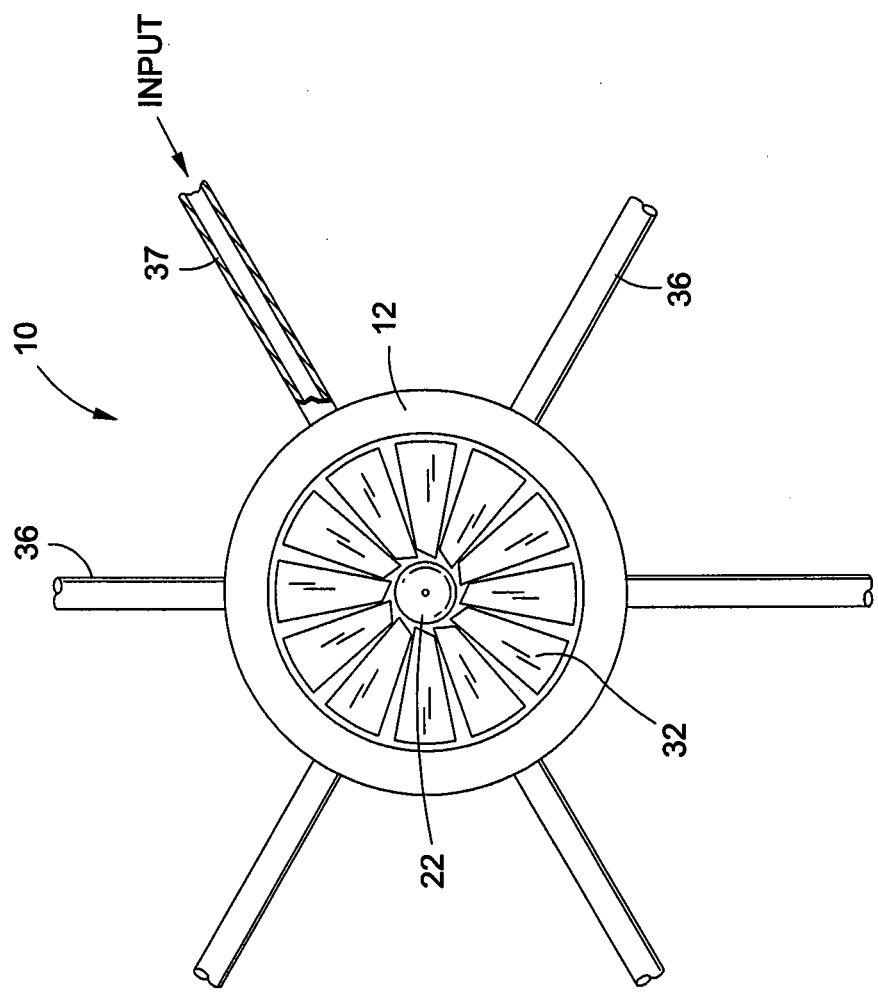
FIG. 2 is a front elevation view of the engine of FIG. 1.
Figure 3:
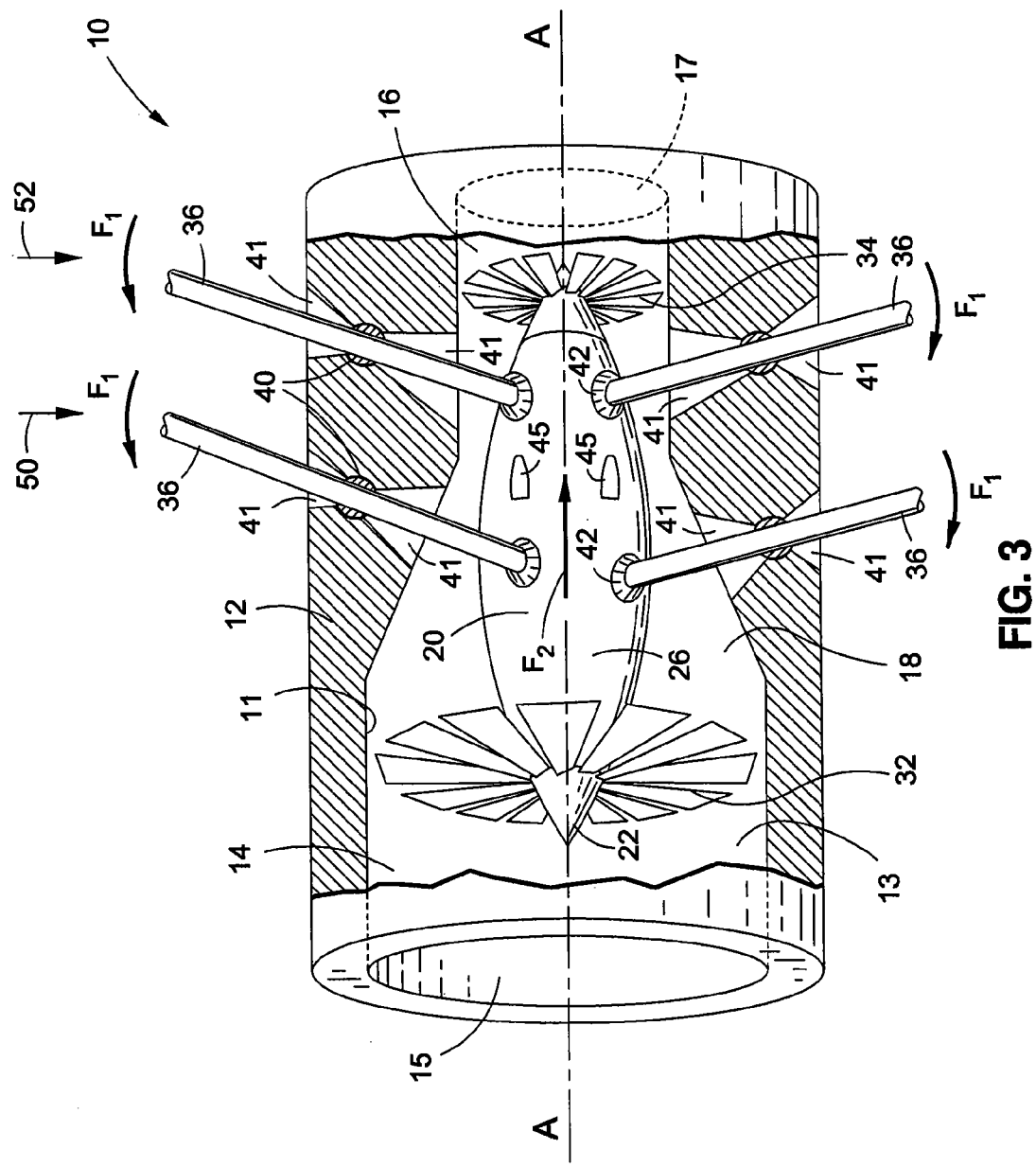
FIG. 3 is a schematic perspective breakaway view of the engine of FIGS. 1 and 2.

As may seen with reference to FIGS. 1-3, in a first embodiment, the engine 10 comprises a hollow casing 12, or housing. The casing has an internal bore 13 that is symmetrical about a first longitudinal axis A-A. An internal wall 11 defines the bore. The bore has a forward portion 14, and a rearward portion 16, each portion being cylindrically tubular in which the forward portion 14 has a preferably larger internal diameter than the rearward portion 16. An intermediate internal portion 18 connects the forward to the rearward portion, in an internal frusto-conical shape. The reduction of the internal diameter of the casing moving from front to back has useful consequences for the operation of the engine, as set forth more fully below.

Positioned along the first axis A-A of the casing, and within the casing, is a center body 20 that is configured to have a highly efficient aerodynamic shape, whereby air flowing through the casing is subjected to a minimum amount of turbulence and interference. The center body 20 is symmetrical about a second longitudinal axis that extends coaxially with the first axis of symmetry A-A of the casing.

The center body is split into three components, a rotatable forward hub 22, a rotatable rearward hub 24, and a rotationally fixed middle hub 26. The middle hub is sandwiched, or flanked, between and adjacent to each of the forward hub and the rearward hub. The middle hub 26 is configured with a tubular bore 28 extending along the second axis. The forward hub 22 and the rearward hub 24 are connected to each other by a rod 30, extending along the bore 28, that causes the forward and rearward hubs to rotate in unison when they rotate. A first set of fan blades 32 is attached to the forward hub 22, and a second set of fan blades 34 is attached to the rearward hub 24.

The center body 20 is preferably supported centrally within the bore 13 of the casing in the following manner. Tubular support elements 36 are provided that initially penetrate the casing 12 from the outside and extend into the casing to penetrate the middle hub 26 of the center body. The support elements 36 are supported on the casing preferably by cylindrical bearings 40 that are positioned within mating cylindrical sockets in the casing. The support elements 36 pass through the cylindrical bearings so that if a backward or forward force (as indicated by arrow $F_1$ in FIG. 3) is applied to an external portion of a support element, the relevant cylindrical bearing rotates in its mating cylindrical socket to allow an internal portion of the support elements to move forward or backward, resulting in a rearward force (indicated by arrow $F_2$ in FIG. 3) to be applied to the center body 20. Slots 41 are cut into the casing to provide a space for the support elements 36 to pivot backward and forward. The bearings 40 are also configured to permit the support element a small amount of longitudinal sliding through the bearing. Each internal terminal end of the support element is configured to penetrate the middle hub 26 of the center body at the location of an additional cylindrical bearing 42 positioned within a mating cylindrical socket in the middle hub 26. Under this arrangement, the center body 20 may be moved translationally backward or forward along the axis A-A of the bore of the casing 12 by applying an appropriate force to the portions of the support elements 36 that lie outside the casing 12. The small amount of sliding by the support element 36 permitted by the bearings 40 in the casing, and the slots 41 in the casing, allow free translational movement of the center body 20 in the bore 13 without obstruction or binding of any moving part.

In another aspect of the invention, some of the support elements 36 may be a hollow tube defining a bore 37 (best seen in FIGS. 1 and 2). At the point at which each of these support elements 36 penetrate the middle hub 26, the bore 37 of the hollow tube is continued by a bore 44 inside the middle hub that extends to the outer surface of the middle hub, as seen in FIG. 1. This feature allows liquid nitrogen that is introduced into the tubular support element on the outside of the casing 12 (see, e.g., "input" in FIGS. 1 and 2) to flow through the casing 12 and into the middle hub 26, to emerge through an opening 45 on the external surface 19 of the middle hub, where it forms part of the driving force of the engine—as described more fully below. In another embodiment, liquid nitrogen may be delivered via a tube to an inside surface of the bore 13, where it may undergo evaporation.

In use, the engine 10 of the present invention operates as follows in a preferred embodiment. The forward fan blades 32 may be initially made to rotate under an external influence such as a starter fan (not shown) blowing, or sucking, air into the forward opening 15 of the casing so that the air passes through the bore 13 and out of the back opening 17. Alternatively, the forward fan blades 32 may themselves be directly rotated by motor (not shown) with the same effect. It will be appreciated that the intermediate portion 18 of the casing, combined with the presence of the center body 20 in the bore 13 of the casing, reduces the diameter of the channel through which the air is moving, thereby making the air flow faster through what is in effect a venturi constriction. It will be understood by one of ordinary skill, following the principle of Bernoulli, that the velocity head of the air will be a maximum, and the pressure head of the air will be a minimum, where the constriction in the bore is the greatest. It will also be understood that the location of the greatest constriction along the axis A-A of the bore 13 will depend on both the profile of the center body 20 and the internal shape of the bore 13 extending through the casing 12. It will also be appreciated that this location along the axis A-A may be mechanically altered by moving the center body 20 backwards or forwards, which may be achieved by applying a force to the portions of the support elements 36 lying outside the casing. It will be further appreciated that the size of the greatest constriction in the bore may also be altered by moving the center body which will have the effect of increasing or decreasing the size of the bore at the constriction. Preferably the center body 20 is shaped, and the surface openings 45 in the center body are positioned, so that the surface openings 45 can be translationally moved (with the center body 20) to coincide with the location of greatest constriction in the bore, or may be moved away from that location to a location of lesser constriction. This ability to alter both the size and the location of the greatest constriction in the bore 13 in relation to opening 45 on the center body 20 allows a user to optimize air flow, air density, air pressure, and other parameters associated with air flowing through the casing 12, thereby allowing the user to adjust for temperature, altitude, and other external factors affecting the operation of the engine.

Continuing with the method of operation, as soon as air is flowing at an adequate speed through the bore 13 of the casing as described above, liquid nitrogen may be introduced onto the external surface of the center body through the openings 45, via those support elements 36 that include a tubular bore 37. It will be understood by one of ordinary skill that the pressure head of the moving air at the openings 45 will be much lower than atmospheric pressure, due to the venturi effect taking place in the bore of the casing. This low pressure head condition will cause the liquid nitrogen to evaporate extremely rapidly to produce gaseous nitrogen, to the extent that the resulting near instantaneous evaporation (or, effectively, flash evaporation) will have an effect similar to that of an explosion in which gases suddenly develop from solid or liquid form, and expand. It is well known that the volume of a liquid (in this case liquid nitrogen) expands when it changes from liquid to a gaseous phase, so that the gas occupies a space many hundred times the volume it occupied as a liquid. However, because the air moving through the bore of the casing is directed rearwards, the expansive force of the effective explosion in nitrogen volume will be to direct the resultant nitrogen gas out of the back opening 17 of the casing, thus (a) propelling the engine 10 forwards under an exchange of momentum, and (b) causing the rearward fan blades 34 to rotate. The rotation of the rearward fan blades 34 causes the forward fan blades 32 to rotate in unison (being connected together via rod 30), and the rotation of the forward fans, combined with the forward movement of the casing, draws more air into the front opening 15 of the casing so that a steady state condition is established for a time, in which air is drawn into the forward opening 15 of the casing, liquid nitrogen introduced from outside the casing flash evaporates in the bore 13 and escapes from the rear opening 17 of the casing mixed with air. Thus, once the liquid nitrogen evaporates and escapes under a steady state, any external motor for rotating the forward fan blades 32 may be switched off, leaving the forward fans 32 to be rotated as a result of the escaping evaporated nitrogen and the air mixed with the nitrogen.

In an advantageous aspect of the described configuration, the air that is caused to flow through the casing has a temperature that is substantially higher than the temperature of the liquid nitrogen introduced into the bore 13 via the tubular support elements 36. This steady flow of warmer air contributes to the energy needed to cause the nitrogen to change phase from liquid to gas. Without the air flow, the casing may tend to cool down to a point where the liquid nitrogen might not evaporate with sufficient rapidity. Thus, the arrangement, as described, provides for a continuous flow of relatively warm air through the casing, evaporation of liquid nitrogen, and forward thrust of the engine for as long as the supply of nitrogen lasts.

The embodiment described has other features that are preferred. Two banks of support elements 36, each bank comprising three support elements, preferably provide stability to the center body 20. A forward bank 50 stabilizes the forward end of the center body, and a rearward bank 52 stabilizes the rearward end of the center body. The support elements in a single bank are preferably arranged around the casing at 120 degree intervals, radiating away from the axis A-A. Furthermore, each stabilizer of one set of stabilizers may be fashioned to include a tubular bore 37 for transporting liquid nitrogen into the casing 12.

The engine thus described may be used in a number of capacities. It may be used as a booster propulsion means to a vehicle with an existing propulsion means, or it may be used as the exclusive propulsion means. The engine is light, comprising only one rapidly moving part in the form of the two connected sets of fan blades 32 and 34. The engine is simple to construct, and therefore inexpensive. The fuel, nitrogen, is a gas that is readily available in the atmosphere. When exhausted back into the atmosphere, it does not cause harmful effects to the environment, but passes back into the atmosphere without damaging effect.

Figure 4:
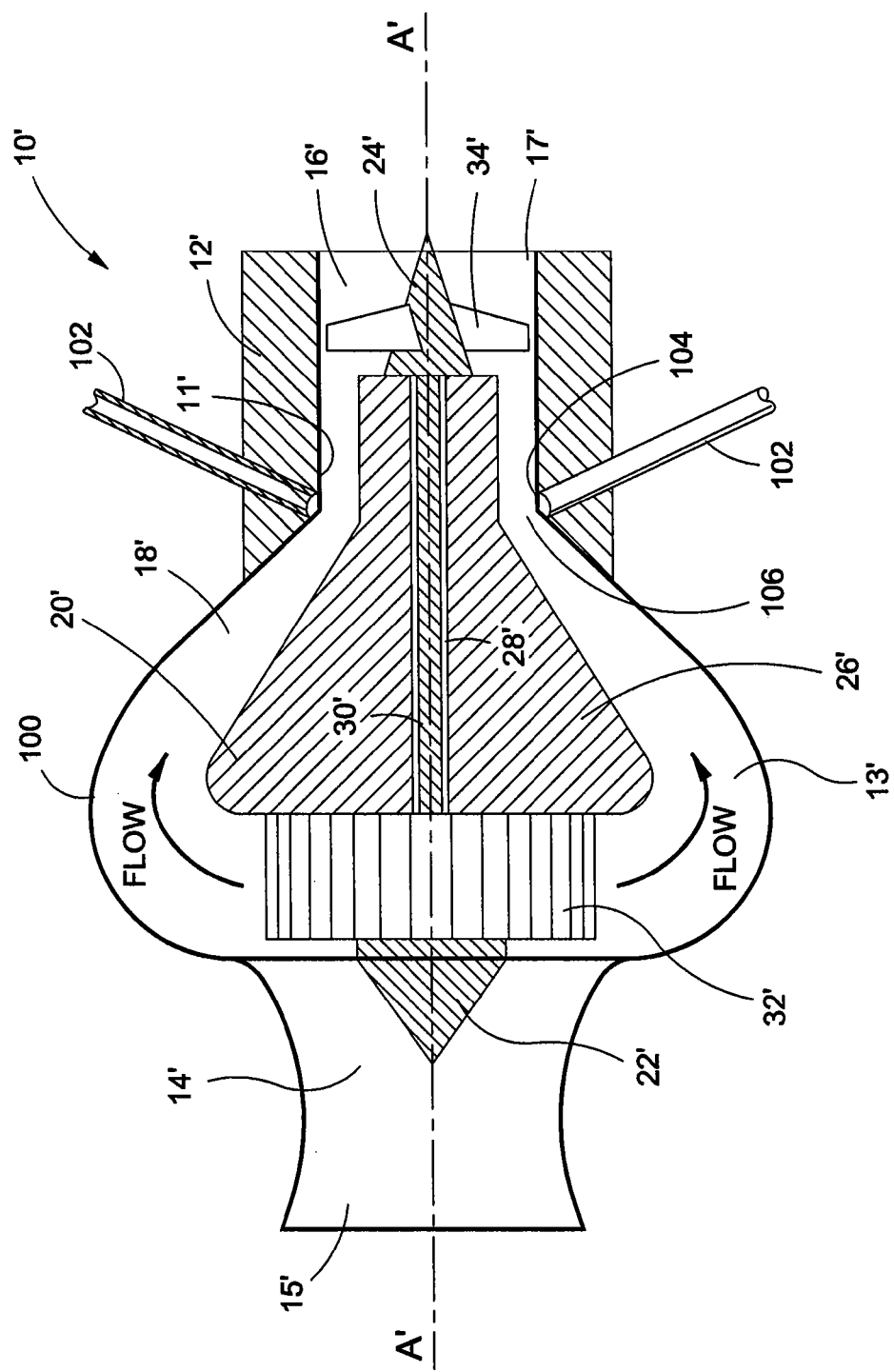
FIG. 4 is sectional side view of an alternative embodiment of an engine having features of the present invention.

Turning now to a second embodiment of the invention, FIG. 4 shows an engine 10' that has a variation of the structure described in FIGS. 1-3. Where the engine 10' of the second embodiment shares structural components that play an equivalent role to structure found in the first embodiment, the reference numerals identifying the component in the second embodiment are given a "prime" mark. For example, the casing of the second embodiment is identified with the numeral 12' (or, 12 prime) to indicate that it plays an equivalent role as casing 12 of the first embodiment. The engine 10' has a center body 20' that is split into three components, a rotatable forward hub 22', a rotable rearward hub 24', and a rotationally fixed middle hub 26'. The middle hub is sandwiched, or flanked, between and adjacent to each of the forward hub and the rearward hub. The middle hub is configured with a tubular bore 28' extending along the second axis. The forward hub 22' and the rearward hub 24' are connected to each other by a rod 30' that causes the forward and rearward hubs 22' and 24' to rotate in unison when they rotate. A first set of fan blades 32' are attached to the forward hub 22', and a second set of fan blades 34' are attached to the rearward hub 24'. The difference between this second embodiment and the first embodiment is that the fan 32' is configured to expel air radially outwardly from the fan 32' (as indicated by the arrow marked "flow" in FIG. 4), rather than directly rearwardly and across the fan blades as in the first embodiment fan 32. The air departing the fan 32' radially outwardly is then forced rearwardly by a shaped cowling 100 that causes the moving air stream to return rearwardly and radially inwardly, so that it must eventually escape from the casing 12' through rearward opening 17' in the bore 13'.

The second embodiment of the engine 10' may also be supported by support elements 36 as in the first embodiment, that are configured to allow the center body to move translationally back and forth along center line A'-A', and that also deliver liquid nitrogen to the bore 13' of the casing. However, FIG. 4 does not show this means of support by support elements 36, but shows a different embodiment of a tubular liquid nitrogen delivery tube 102 which penetrates the casing from outside the casing 12' to inside the bore 13', that is configured to deliver liquid nitrogen into the bore. In this case, the delivery tube 102 discharges the liquid nitrogen at an opening 104 on an inner wall 11' of the bore 13'.

In operation, the second embodiment of the engine 10' shown in FIG. 4 will operate similarly to the first embodiment exemplified in FIGS. 1-3. Air will be initially drawn into the forward opening 15' of the bore by an independent fan or motor (not shown) and expelled out of the rear opening 17'. Liquid nitrogen will be discharged into the bore 13' in the region where the bore throttles down to a narrowed orifice 106 or constriction in the bore through a delivery tube 102. Flash evaporation of the liquid nitrogen will be expelled out of the rear opening 17' in the casing to provide a forward propulsive force to the engine 10'. The rearward fan 34' will be driven by the force of the escaping nitrogen mixed with air, and this will in turn drive the forward fan 32' via connecting rod 30' to draw more air into the front opening 15'. Once a steady state is achieved in which air is sucked inward through the bore 13' of the casing by the force of evaporating nitrogen, the independent fan or motor is switched off. The steady state condition may be optimized by moving the center body 20' backward or forward (using movable support elements 36 such as shown in FIGS. 1-3) to adjust the size of the venturi orifice 106 in the bore. This adjustment may take into account different conditions of atmospheric pressure, temperature, and humidity and may allow a desired evaporation rate of the liquid nitrogen to be established. The steady state evaporation may prevail under these conditions until the source of liquid nitrogen is depleted.

Thus, it is seen that the system and structure of the present invention provides novel and useful features for an alternative form of motive propulsion by engine. The present invention may, of course, be carried out in other specific ways than those herein set forth without departing from the essential characteristics of the invention. The present embodiment are, therefore, to be considered in all respects as illustrative and not restrictive, and all changes coming within the meaning and equivalency range of the appended claims are intended to be embraced therein.

I claim:

1. An engine for providing motion comprising:
   a casing with a forward terminal end and a rearward terminal end, the casing having a hollow interior defined by a bore that has an axis of symmetry, the bore extending continuously along the axis from the forward end to the rearward end, the bore including a flow constriction at a location between the forward end and the rearward end;
   a center body positioned within the bore and sized such that the bore is not completely obstructed at any point between the forward end and the rearward end, the center body including a forward hub, a middle hub, and a rearward hub, the middle hub being flanked by the forward hub and the rearward hub, wherein the forward hub and the rearward hub are connected to each other by a rod extending rotationally freely through the middle hub whereby the forward hub and the rearward hub are configured to rotate in unison while the middle hub remains rotationally stationary;
   a forward fan attached to the forward hub;
   a rearward fan attached to the rearward hub, wherein the rearward fan is configured to drive the forward fan, and the forward fan is configured to draw air from outside the casing into the bore, the forward fan, rearward fan, and bore being configured in relation to each other such that air drawn into the casing is propelled through the bore in a continuous stream from the forward end to the rearward end;

a plurality of support elements, each support element being connected to the casing at a first portion of the support element, and to the middle hub at a second portion of the support element, the support elements being collectively configured to support the middle hub in relation to the casing;

at least one delivery tube extending from a first location outside the casing to a second location in the bore of the casing, the delivery tube being configured to deliver liquid nitrogen from the first location to the second location.

2. The engine of claim 1, wherein the at least one delivery tube comprises a hollow bore extending within one of the support elements.

3. The engine of claim 2, wherein the bore extending within one of the support elements connects to a bore extending within the middle hub.

4. The engine of claim 3, wherein the bore extending within the middle hub opens onto an external surface of the middle hub.

5. The engine of claim 1, wherein each support element is connected to the casing at the first portion of the support element through a first rotationally movable bearing, and is connected to the middle element at the second portion of the support element through a second rotationally movable bearing, whereby the center body is movable along the axis of the bore while being supported by the support elements.

6. The engine of claim 1, wherein the flow constriction in the bore includes the center body positioned to partially obstruct a portion of the bore.

7. The engine of claim 6, wherein the bore has an internal diameter, and the flow constriction includes a narrowing of the internal diameter.

8. The engine of claim 1 wherein the forward fan is configured to drive air perpendicularly across a diameter of the fan.

9. The engine of claim 1, wherein the forward fan is configured to drive air parallel with a diameter of the fan.

10. A method of providing propulsive power comprising:
providing an engine casing having a bore extending from a forward terminal end of the casing to a rearward terminal end of the casing;
forcing air in a continuous stream through the bore from the forward end to emerge from the bore at the rearward end;
injecting liquid nitrogen into the bore at the same time that air is being forced through the bore;
evaporating the liquid nitrogen into gaseous form in the presence of the air;
expelling the gaseous nitrogen, mixed with air, from the rearward end of the casing thereby providing a forwardly propulsive force to the casing.

11. The method of claim 10, wherein forcing air through the bore includes rotating a first fan inside the bore using, as a rotational propellant, the nitrogen mixed with air being expelled from the casing, and thereby rotating a second fan connected to the first fan so that the second fan draws air into the casing.

12. The method of claim 10, wherein forcing air through the bore includes forcing the air past a constriction in the bore, thereby accelerating the air in the vicinity of the constriction.

13. The method of claim 12, wherein forcing air past a constriction includes forcing the air past a reduction in an internal diameter of the bore.

14. The method of claim 12, wherein forcing air past a constriction includes forcing the air around an aerodynamically shaped element located within the bore.

15. The method of claim 12, wherein injecting liquid nitrogen into the bore includes injecting the liquid nitrogen to a location in the bore that coincides with the location of the constriction in the bore.

16. The method of claim 10, further including electively changing the size of the constriction in the bore.

17. The method of claim 16, wherein changing the size of the constriction in the bore includes moving an aerodynamically shaped object along the axis of the bore.

* * * * *